United States Patent
Satou et al.

(10) Patent No.: US 11,611,864 B2
(45) Date of Patent: Mar. 21, 2023

(54) DEVICE-REGISTRATION-OPERATION ASSISTING APPARATUS

(71) Applicant: DAIKIN INDUSTRIES, LTD., Osaka (JP)

(72) Inventors: Daisuke Satou, Osaka (JP); Shin Higashiyama, Osaka (JP); Hiroshi Dohmae, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 17/435,659

(22) PCT Filed: Mar. 13, 2020

(86) PCT No.: PCT/JP2020/011174
§ 371 (c)(1),
(2) Date: Sep. 1, 2021

(87) PCT Pub. No.: WO2020/184710
PCT Pub. Date: Sep. 17, 2020

(65) Prior Publication Data
US 2022/0046405 A1    Feb. 10, 2022

(30) Foreign Application Priority Data

Mar. 13, 2019   (JP) .............................. JP2019-046102

(51) Int. Cl.
*H04W 4/00* (2018.01)
*H04W 8/00* (2009.01)
*H04W 60/04* (2009.01)
(52) U.S. Cl.
CPC ........... *H04W 8/005* (2013.01); *H04W 60/04* (2013.01)
(58) Field of Classification Search
CPC .............................. H04W 8/005; H04W 60/04
See application file for complete search history.

(56) References Cited

U.S. PATENT DOCUMENTS

2007/0067431 A1    3/2007   Yoshihara et al.
2008/0309464 A1*  12/2008  Chihara .................. H04L 67/36
                                                                340/10.42
(Continued)

FOREIGN PATENT DOCUMENTS

JP      2007-53530 A     3/2007
JP      2008-311840 A   12/2008
(Continued)

OTHER PUBLICATIONS

International Search Report of corresponding PCT Application No. PCT/JP2020/011174 dated Jun. 16, 2020.
(Continued)

*Primary Examiner* — Justin Y Lee
(74) *Attorney, Agent, or Firm* — Global IP Counselors, LLP

(57) ABSTRACT

A device-registration-operation assisting apparatus in a device management system including a plurality of devices installed in a building and a management device connected to the devices via a network, assists in an operation to register the devices. The device-registration-operation assisting apparatus includes an emission unit of an electromagnetic wave, and a mobile terminal. The emission unit is integrated into or positioned near one of the plurality of devices. The mobile terminal includes a receiving unit that receives the electromagnetic wave, a display unit that displays information of the device, and an input unit that receives an input of registration information in order to register the device displayed on the display unit in the device management system. The display unit does not display the information of the device for which the registration information is input to the input unit, or changes display of the information.

10 Claims, 6 Drawing Sheets

(56) References Cited

U.S. PATENT DOCUMENTS

| | | | |
|---|---|---|---|
| 2014/0236320 A1 | 8/2014 | Sasaki et al. | |
| 2014/0236326 A1 | 8/2014 | Sasaki et al. | |
| 2015/0317061 A1* | 11/2015 | Sasaki | H04L 12/282 |
| | | | 715/733 |
| 2016/0381767 A1 | 12/2016 | Tiberi et al. | |
| 2017/0366368 A1 | 12/2017 | Crayford et al. | |
| 2018/0084517 A1* | 3/2018 | Do | H04W 4/029 |
| 2019/0296932 A1* | 9/2019 | Jang | H04L 63/08 |
| 2020/0059320 A1* | 2/2020 | Kim | H04L 1/0035 |

FOREIGN PATENT DOCUMENTS

| | | |
|---|---|---|
| JP | 4325592 B2 | 6/2009 |
| JP | 2014-107861 A | 6/2014 |
| JP | 2015-5459 A | 1/2015 |
| JP | 6167971 B2 | 7/2017 |
| JP | 2017-175670 A | 9/2017 |

OTHER PUBLICATIONS

International Preliminary Report of corresponding PCT Application No. PCT/JP2020/011174 dated Sep. 23, 2021.
European Search Report of corresponding EP Application No. 20 77 0026.1 dated Apr. 21, 2022.

\* cited by examiner

| DEVICE REGISTRATION | YAMADA BUILDING | | JULY 1, 2018<br>TOTAL NUMBER OF DEVICES: 90<br>NUMBER OF REGISTERED DEVICES: 31<br>NUMBER OF UNREGISTERED DEVICES: 59 | | |
|---|---|---|---|---|---|

| DEVICE NO. | MAC ADDRESS | FLOOR | ROOM NO. | ADDRESS ON MAP | CHECK |
|---|---|---|---|---|---|
| ... | ... | ... | ... | ... | ... |
| 11 | 04-A3-A5-2C-3D-11 | 5 | 501 | 5-501-001 | ☑ |
| 12 | 04-A3-A5-2C-3D-12 | 5 | 501 | 5-501-002 | ☑ |
| 13 | 04-A3-A5-2C-3D-13 | | | | ☐ |
| 14 | 04-A3-A5-2C-3D-14 | | | | ☐ |
| 15 | 04-A3-A5-2C-3D-15 | | | | ☐ |
| 16 | 04-A3-A5-2C-3D-16 | | | | ☐ |
| ... | ... | ... | ... | ... | ... |

ROOM 501, 5F, YAMADA BUILDING

FIG. 3

| DEVICE REGISTRATION | YAMADA BUILDING | | | JULY 1, 2018<br>TOTAL NUMBER OF DEVICES: 90<br>NUMBER OF REGISTERED DEVICES: 31<br>NUMBER OF UNREGISTERED DEVICES: 59 | |
|---|---|---|---|---|---|
| DEVICE NO. | MAC ADDRESS | FLOOR | ROOM NO. | ADDRESS ON MAP | CHECK |
| ........ | ........ | ........ | ........ | ........ | |
| 11 | 04-A3-A5-2C-3D-11 | 5 | 501 | 5-501-001 | ☑ |
| 12 | 04-A3-A5-2C-3D-12 | 5 | 501 | 5-501-002 | ☑ |
| 13 | 04-A3-A5-2C-3D-13 | | | | ☐ |
| 14 | 04-A3-A5-2C-3D-14 | | | | ☐ |
| 15 | 04-A3-A5-2C-3D-15 | | | | ☐ |
| 16 | 04-A3-A5-2C-3D-16 | | | | ☐ |

SELECT A DEVICE ON THE MAP

ROOM 501, 5F, YAMADA BUILDING

FIG. 4

DEVICE REGISTRATION

YAMADA BUILDING

JULY 1, 2018
TOTAL NUMBER OF DEVICES: 90
NUMBER OF REGISTERED DEVICES: 31
NUMBER OF UNREGISTERED DEVICES: 59

| DEVICE NO. | MAC ADDRESS | FLOOR | ROOM NO. | ADDRESS ON MAP | CHECK |
|---|---|---|---|---|---|
| ... | ... | ... | ... | ... | ... |
| 11 | 04-A3-A5-2C-3D-11 | 5 | 501 | 5-501-001 | ☑ |
| 12 | 04-A3-A5-2C-3D-12 | 5 | 501 | 5-501-002 | ☑ |
| 13 | 04-A3-A5-2C-3D-13 | 5 | 501 | 5-501-003 | ☐ |
| 14 | 04-A3-A5-2C-3D-14 | | | | ☐ |
| 15 | 04-A3-A5-2C-3D-15 | | | | ☐ |
| 16 | 04-A3-A5-2C-3D-16 | | | | ☐ |

ARE YOU SURE THIS ADDRESS IS REGISTERED?

YES    NO

ROOM 501, 5F, YAMADA BUILDING

EAST

CORRIDOR

NO.1  NO.3  NO.5

NO.2  NO.4  NO.6

NORTH ←    → SOUTH

WINDOW

WEST

FIG. 5

| DEVICE REGISTRATION | YAMADA BUILDING | | | JULY 1, 2018<br>TOTAL NUMBER OF DEVICES: 90<br>NUMBER OF REGISTERED DEVICES: 32<br>NUMBER OF UNREGISTERED DEVICES: 58 | |
|---|---|---|---|---|---|

| DEVICE NO. | MAC ADDRESS | FLOOR | ROOM NO. | ADDRESS ON MAP | CHECK |
|---|---|---|---|---|---|
| ... | ... | ... | ... | ... | ... |
| 11 | 04-A3-A5-2C-3D-11 | 5 | 501 | 5-501-001 | ☑ |
| 12 | 04-A3-A5-2C-3D-12 | 5 | 501 | 5-501-002 | ☑ |
| 13 | 04-A3-A5-2C-3D-13 | 5 | 501 | 5-501-003 | ☑ |
| 14 | 04-A3-A5-2C-3D-14 | | | | ☐ |
| 15 | 04-A3-A5-2C-3D-15 | | | | ☐ |
| 16 | 04-A3-A5-2C-3D-16 | | | | ☐ |
| ... | ... | ... | ... | ... | ... |

ROOM 501, 5F, YAMADA BUILDING

FIG. 6

DEVICE-REGISTRATION-OPERATION ASSISTING APPARATUS

CROSS-REFERENCE TO RELATED APPLICATIONS

This U.S. National stage application claims priority under 35 U.S.C. § 119(a) to Japanese Patent Application No. 2019-046102, filed in Japan on Mar. 13, 2019, the entire contents of which are hereby incorporated herein by reference.

BACKGROUND

Field of the Invention

A device-registration-operation assisting apparatus that assists in an operation for registering a device installed in a building in a management device connected to the device via a network.

Background Information

A system is known in which a plurality of devices installed in a building are managed by a management device connected to the devices via a network. Such a device management system requires advance preparation including registration of arrangement addresses of the plurality of devices in the building in the management device (described in, for example, Japanese Patent No. 6167971)).

SUMMARY

In the related art, such registration of the arrangement addresses of the devices is a considerably complicated operation. The reason for this is that particularly when a large number of devices of the same type are arranged in the same building, it is necessary to identify at which address in the building each device is arranged.

A device-registration-operation assisting apparatus according to a first aspect assists in an operation for registering a device in a device management system. The device management system includes a plurality of devices and a management device. The plurality of devices are installed in a building. The management device is connected to the devices via a network. The device-registration-operation assisting apparatus includes an emission unit and a mobile terminal. The emission unit is integrated into or positioned near each of the plurality of devices. The emission unit emits an electromagnetic wave. The mobile terminal includes a receiving unit, a display unit, and an input unit. The receiving unit receives the electromagnetic wave. The display unit displays information on the device into or near which the emission unit from which the electromagnetic wave is emitted is integrated or positioned. The input unit receives an input of registration information for registering the device displayed on the display unit in the device management system. The display unit does not display the information of the device for which the registration information is input to the input unit, or changes display of the information.

In the device-registration-operation assisting apparatus according to the first aspect, since a registered device is not displayed or the display of the registered device is changed, an operator is able to easily grasp the registered device. Conversely, the operator is able to easily grasp an unregistered device.

A device-registration-operation assisting apparatus according to a second aspect is the apparatus according to the first aspect, in which the emission unit stops emission of the electromagnetic wave after the receiving unit receives the electromagnetic wave.

In the device-registration-operation assisting apparatus according to the second aspect, stopping emission of an electromagnetic wave can avoid the risk of duplicate registration of the same device.

A device-registration-operation assisting apparatus according to a third aspect is the apparatus according to the first aspect, in which the emission unit continues to emit the electromagnetic wave after the receiving unit receives the electromagnetic wave, and the display unit does not display the information of the device for which the registration information is input to the input unit, or changes the display of the information.

The device-registration-operation assisting apparatus according to the third aspect ensues that the operator can be informed of the completion of the registration of the device.

A device-registration-operation assisting apparatus according to a fourth aspect is the apparatus according to any one of the first to third aspects, in which the display unit is capable of displaying a map for an inside of the building.

The device-registration-operation assisting apparatus according to the fourth aspect can provide information useful for the operator, and promotes smooth input using a GUI.

A device-registration-operation assisting apparatus according to a fifth aspect is the apparatus according to any one of the first to fourth aspects, in which the display unit is capable of displaying a list of a plurality of devices including the device into or near which the emission unit is integrated or positioned.

The device-registration-operation assisting apparatus according to the fifth aspect can display device registration information in a list view and can inform the operator of an overview of the targets of the registration operation.

BRIEF DESCRIPTION OF DRAWINGS

FIG. 3 is a diagram (1) illustrating display on the mobile terminal 40 during the device registration operation.

FIG. 4 is a diagram (2) illustrating display on the mobile terminal 40 during the device registration operation.

FIG. 5 is a diagram (3) illustrating display on the mobile terminal 40 during the device registration operation.

FIG. 6 is a diagram (4) illustrating display on the mobile terminal 40 during the device registration operation.

DETAILED DESCRIPTION OF EMBODIMENT(S)

First Embodiment (1) Configuration of Device Management System 1

(1-1) Overall Configuration of Device Management System 1

Figure 1A:
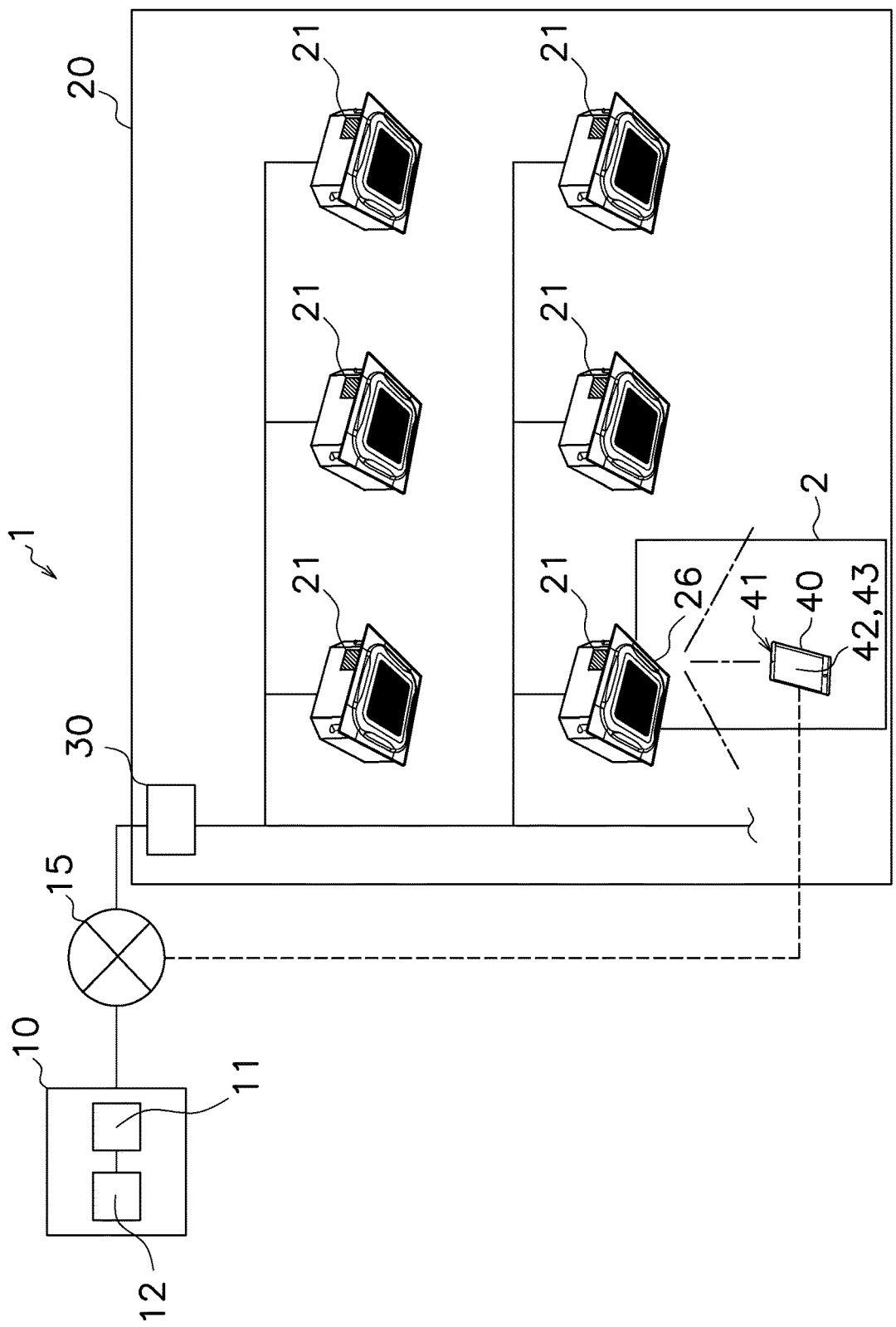
FIG. 1A is an overall configuration diagram of a device management system 1 and a device-registration-operation assisting apparatus 2.

As illustrated in FIG. 1A, a device management system 1 according to this embodiment includes devices 21, an information transfer device 30, and a management device 10. The devices 21 are installed in a building 20. Examples of the devices 21 include air conditioners. The information transfer device 30 is connected to the devices 21 and is further connected to a network 15. The management device 10 is connected to the information transfer device 30 via the network 15. The management device 10 is capable of acquiring data concerning the devices 21 from the information transfer device 30. The data concerning the devices 21 is, for example, operation information of the devices 21.

The device management system 1 according to this embodiment provides a service for managing the devices 21. The management device 10 acquires device information related to the devices 21 via the network 15. The system 1 controls the devices 21 on the basis of the device information. In other words, the system 1 provides a service for managing the devices 21.

(1-2) Configuration of Individual Units of Device Management System 1

(1-2-1) Devices 21

The devices 21 are devices installed in the building 20. The term building includes not only the inside of the building but also the rooftop of the building and the surroundings of the building. The building 20 is not limited, examples of which include a commercial building, a residential apartment, a condominium, a public building, and a detached house.

Examples of the devices 21 include air conditioners and lighting devices. In an air conditioner, an outdoor unit and a plurality of indoor units connected to the outdoor unit may be collectively handed as a single device, or the outdoor unit and the indoor units may be regarded as separate devices. The building 20 has a plurality of rooms (not illustrated). Each room typically has arranged therein one or more indoor units of an air conditioner.

In this specification, information related to the devices 21 is broadly referred to as device information. In the device information, information included in each device before registration of the device is mainly identification information of the device. Examples of the identification information include a MAC address. Information input by an operator when a device is registered is referred to as registration information. The registration information is position information of the device. The position information is also an address on a map.

(1-2-2) Information Transfer Device 30

The information transfer device 30 is typically arranged in the building 20 in which the devices 21 are arranged. The information transfer device 30 is connected to the devices 21. In this embodiment, the devices 21 can communicate with the management device 10 via the information transfer device 30. Each of the devices 21 may be configured to be capable of directly communicating with the management device 10 via the network 15 without the intervention of the information transfer device 30.

(1-2-3) Management Device 10

The management device 10 includes a server 11 and a database 12. The management device may be a virtualized device. The server 11 includes a processor and a memory. The server 11 is capable of executing an application for controlling the devices 21. The database 12 includes a memory. The device information can be accumulated in and retrieved from the database 12. The device information includes identification information of the devices.

The management device 10 may be provided by a cloud service provider different from a provider of a management service disclosed herein. The cloud service provider may provide only an infrastructure. The infrastructure includes hardware. The cloud service provider may provide a platform in addition to an infrastructure. The platform includes an operation system.

The management device 10 is connected to the information transfer device 30 via the network 15. Both devices may be connected via a network, which may be a private network or a public network. The private network may be a virtual private network (VPN). The network may be provided by a cloud service carrier.

The server 11 of the management device 10 acquires the device information from the information transfer device 30. The server 11 sends the acquired device information to the database 12. The database 12 accumulates the device information. The management device invokes the device information accumulated in the database, and determines and executes a device management service.

(2) Device-Registration-Operation Assisting Apparatus 2

To use the device management system 1, it is necessary to register the identification information and the like of each of the devices 21 in the management device 10 in advance. A device-registration-operation assisting apparatus 2 according to this embodiment is an apparatus that assists an operator who performs such a registration operation.

As illustrated in FIG. 1A, the device-registration-operation assisting apparatus 2 according to this embodiment includes an emission unit 26 and a mobile terminal 40.

(2-1) Emission Unit 26

The emission unit 26 is integrated into each of the devices 21 or arranged adjacent to each of the devices 21. In general, one emission unit 26 is required for each of the devices 21. For example, when there are 90 devices 21 to be registered, 90 emission units 26 are required.

The emission unit 26 emits an electromagnetic wave. The emission unit 26 emits an electromagnetic wave that can be received by the mobile terminal 40. The electromagnetic wave is a radio wave or a light wave. The radio wave has a frequency greater than or equal to 1 gigahertz and less than or equal to 70 gigahertz, for example. The light wave is infrared, for example.

(2-2) Mobile Terminal 40

Figure 1B:
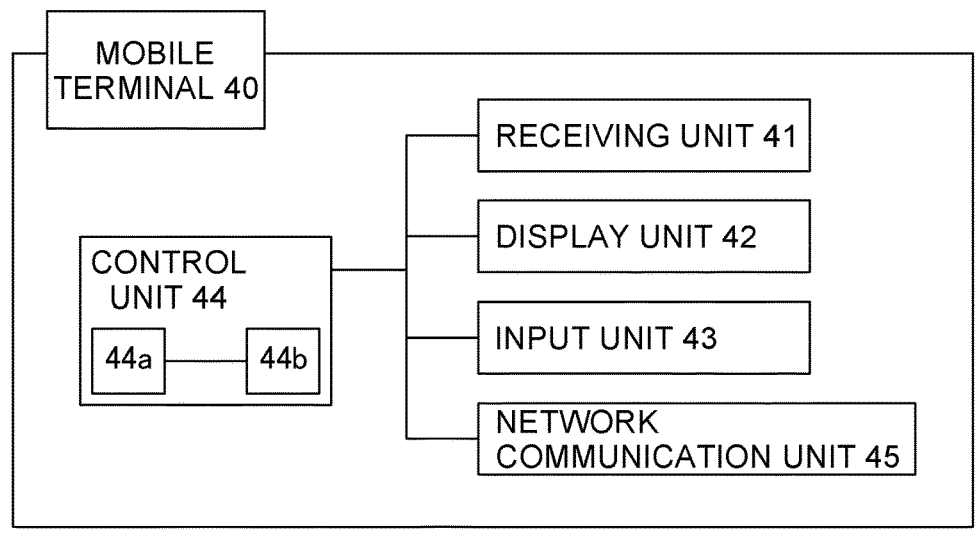
FIG. 1B is a configuration block diagram of a mobile terminal 40.

As illustrated in FIG. 1B, the mobile terminal 40 includes a receiving unit 41, a display unit 42, an input unit 43, a control unit 44, and a network communication unit 45. The mobile terminal 40 is a tablet. The mobile terminal 40 may be a notebook PC. The mobile terminal 40 may be a smartphone. One mobile terminal 40 is provided for each operator.

The receiving unit 41 receives an electromagnetic wave emitted from the emission unit 26.

The control unit 44 includes a processor 44a and a memory 44b. The control unit 44 controls the receiving unit 41, the display unit 42, the input unit 43, and the network communication unit 45. The memory 44b stores data and programs. In this embodiment, the memory 44b stores a program for assisting in a device registration operation.

The display unit 42 is, for example, a liquid crystal panel, an organic EL panel, or the like. The display unit 42 displays information received via an electromagnetic wave or information stored in the memory 44b.

In this embodiment, the input unit 43 is a touch panel. The input unit 43 may be a keyboard or an audio input device. In response to a touch and input by a user, input information is sent to the control unit 44. The control unit 44 sends information to the network 15 from the network communication unit 45.

The network communication unit 45 causes the network 15 and the mobile terminal 40 to communicate with each other via an electromagnetic wave. The network communication unit 45 can transmit information received from the control unit 44 to the management device 10 via the network 15. Conversely, the network communication unit 45 can receive information via the network 15.

The network communication unit 45 may not necessarily be always provided in the mobile terminal 40.

(3) Device Management Registration Operation

Figure 2:
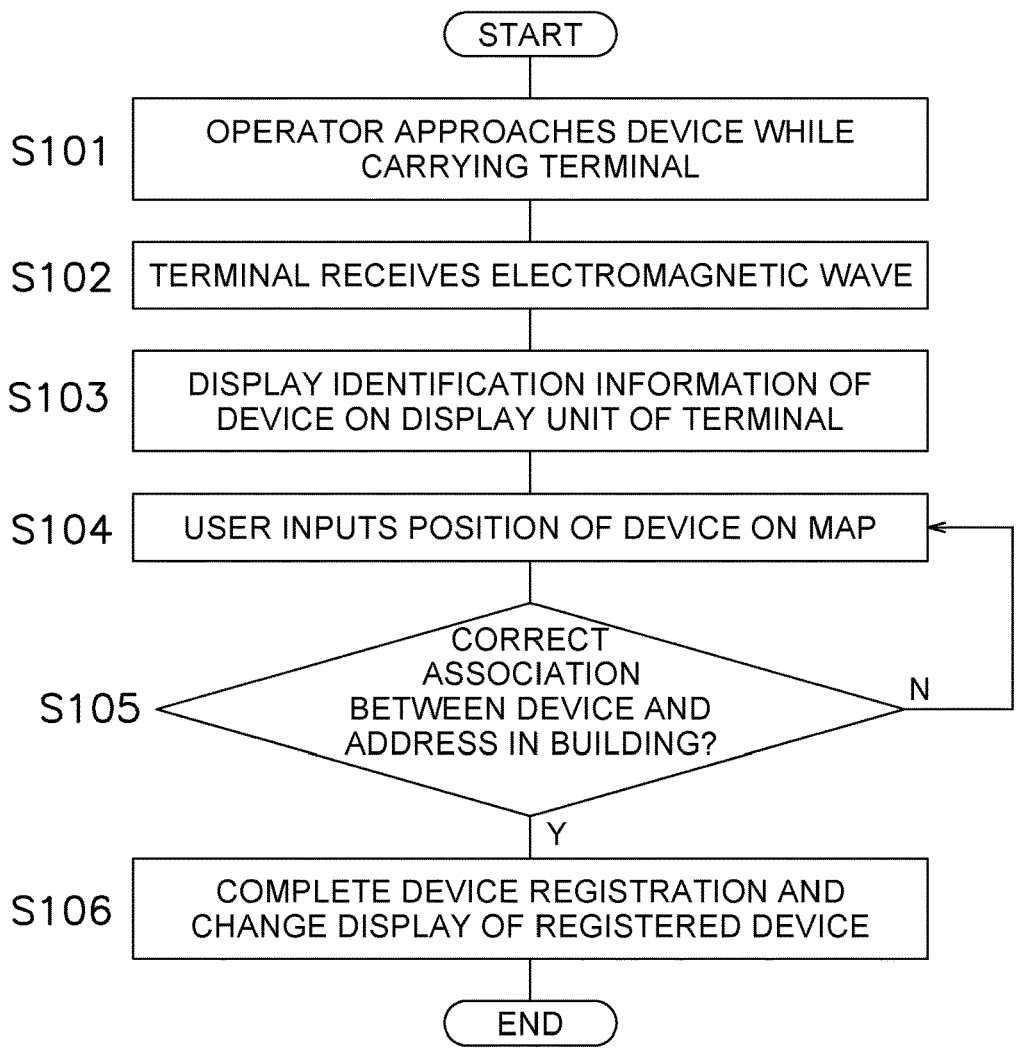
FIG. 2 is a flowchart illustrating the flow of a device registration operation.

Next, an example device registration operation using the device-registration-operation assisting apparatus 2 according to this embodiment will be described with reference to the drawings. FIG. 2 is a flowchart illustrating the flow of a device registration operation. FIG. 3 to FIG. 6 illustrate contents displayed on the display unit 42 in chronological order during the operation. A device operation assisting program implements at least part of the flow illustrated in FIG. 2.

An example registration operation according to this embodiment is an example operation of registering a plurality of devices for one building 20 having a plurality of floors in which a plurality of devices 21 are installed. The name of this building is assumed to be Yamada Building. It is assumed that 90 devices 21 are installed in Yamada Building.

An operator registers all of the 90 devices 21 near the devices 21 while carrying the mobile terminal 40.

(3-1) Description of Advance Preparation for Registration Operation and Display of Display Unit 42 During Registration Operation Each of the devices 21 is assigned in advance a unique physical address, or, in other words, a MAC address. Instead of MAC addresses, any identification information unique to the devices may be used such that, for example, numbers from 1 to 90 may be assigned to the devices. It is assumed that the identification information (here, MAC addresses) of the 90 devices in Yamada Building has been registered in the management device 10. It is further assumed that the MAC addresses have also been stored in the memory 44b of the mobile terminal 40.

It is further assumed that a map of each floor of Yamada Building and information indicating that the locations of the devices 21 in the floors are stored in the memory 44b of the mobile terminal 40 in advance. The location of each of the 90 devices 21, whose MAC addresses have already been identified, in Yamada Building is not grasped. The operation for registration in the management device 10 using the mobile terminal 40 is referred to as a registration operation.

A case will now be described in which, among the 90 devices 21 in Yamada Building, 31 devices 21 have already been registered, and the thirty-second device 21 is to be registered.

FIG. 3 illustrates display of the display unit 42 before this operation is performed. A table in the upper portion of FIG. 3 is a list of pieces of identification information of devices to be registered, and a map in the lower portion of FIG. 3 is a map indicating the layout of the devices 21 in the building 20.

More specifically, in the lower part of FIG. 3, a map indicating the layout of the devices 21 in Room 501 at the fifth floor of Yamada Building is presented. Here, the devices 21 are air conditioners, and all of the devices 21 are attached to the ceiling. FIG. 3 indicates that through the registration operation of up to the thirty-first device 21, the registration of the devices 21 with No. 1 and No. 2 on the north side among the six devices 21 in Room 501 has been completed. In the map in FIG. 3, the devices with No. 1 and No. 2 are hatched.

In the upper part of FIG. 3, a list of the 90 devices 21 is displayed. Each row corresponds to one device 21. The leftmost column presents device numbers 1 to 90. The second column from the left indicates the MAC addresses of the devices. These two columns are input before the registration operation is started. The third and subsequent columns from the left are input through the device registration operation. The third column indicates floor numbers, the fourth column indicates room numbers, and the fifth column indicates addresses (positions) in the building (map). The sixth column, or, in other words, the rightmost column, provides checkboxes that are checked when the registration operation is completed.

In FIG. 3, the registration of the two devices with device Nos. 11 and 12 has been completed. The devices with device Nos. 11 and 12 are both devices in Room 501 and correspond to devices No. 1 and No. 2 in Room 501. In the map in the lower portion of FIG. 3, devices No. 1 and No. 2 are hatched. In the table in the upper portion of FIG. 3, the addresses 5-501-001 and 5-501-002 in the fifth column correspond to No. 1 and No. 2 of the map in the lower portion of FIG. 3, respectively. Since the registration of these devices has been completed, address information (position information) in the map is entered in the third column, the fourth column, and the fifth column, and the checkboxes are checked. In addition, the rows of device Nos. 11 and 12 are hatched.

(3-2) Registration Operation

The term "registration" refers to, finally, recording of information in the management device 10. In this specification, "registration" includes recording information in the mobile terminal 40 and being ready to record the information in the management device 10 once the information is transmitted to the management device 10.

The registration of device No. 3 in Room 501 at the fifth floor of Yamada Building will be described.

The operator causes the display unit 42 to perform the display illustrated in FIG. 3. The operator approaches below device No. 3 with reference to the map in the lower portion of FIG. 3 while carrying the mobile terminal 40 (step S101 in FIG. 2).

At this time, the electromagnetic wave emitted from the emission unit 26 integrated into or positioned near device No. 3 is received by the receiving unit 41 (S102). The electromagnetic wave includes the identification information of device No. 3. In other words, the identification information is the device No. or MAC address in the table in FIG. 3. The mobile terminal 40 selects the row of device No. 13 of the table in the upper portion of FIG. 3 and displays the selected row in a highlighted manner (step S103). Specifically, for example, the row of device No. 13 is displayed in yellow. Further, as illustrated in FIG. 4, the display unit shows a message "Select a device on the map".

Then, the operator taps device No. 3 on the map in FIG. 4 (S104). Then, device No. 3 is selected and display in a highlighted manner illustrated in FIG. 5. Specifically, for example, device No. 3 is displayed in yellow. At the same time, the address (position) on the map, "5-501-003", is entered in the field for device No. 3 in the table in FIG. 5. The row of device No. 13 remains highlighted. Then, the display unit shows a message "Are you sure this address (position) is registered?" (S105).

Then, the operator checks whether the device highlighted in response to receipt of the electromagnetic wave and the current position of the operator in the building are correct, and taps "Yes" to complete the registration (S106).

Upon completion of the registration of device No. 3 on the map, or the device with device No. 13, as illustrated in FIG. 6, the row of device No. 13 in which the address on the map is entered is hatched, and the checkbox is checked. In addition, the number of registered devices in FIG. 5 is increased by 1 to 32, and the number of unregistered devices is decreased by 1 to 58. The registered content is transmitted to the management device 10 from the network communication unit 45 of the mobile terminal 40 and is registered in the management device.

If the identification number of the device and the address of the device on the map are different in step S105, the control unit selects "No" in FIG. 5. Then, the terminal 40 deletes the address on the map in the row of device No. 13 of the table in FIG. 4, and cancels the highlighting of device No. 3 on the map. The operator returns to step S104 and again selects the position of the device corresponding to the identification number on the map.

Consideration will now be given of a case where the operator attempts to perform a registration operation again on a device that has been registered.

The operator approaches the device 21 (S101 in FIG. 2), and the mobile terminal 40 receives an electromagnetic wave (S102). Then, in step S103, if it is determined that the device 21 has been registered, the control unit of the mobile terminal 40 does not present the device information on the display unit. This prevents duplicate registration.

To prevent this in advance, the emission unit 26 may be configured to stop emission of an electromagnetic wave after the terminal 40 receives an electromagnetic wave in step S102. Even when the operator approaches the vicinity of the terminal (S101), the mobile terminal 40 receives no electromagnetic wave (S102). Thus, the device information (including the identification information) is not displayed on the display unit (S103).

Both methods can prevent duplicate registration of a device.

(4) Features (4-1)

In the device management system 1 according to this embodiment, the management device 10 manages the devices 21 via the network 15. To use the device management system 1, it is necessary to register the devices 21 in the management device 10 in advance. The device-registration-operation assisting apparatus 2 according to this embodiment assists in registering the devices 21 in the management device 10.

The device-registration-operation assisting apparatus 2 includes the emission unit 26 and the mobile terminal 40. The emission unit 26 is integrated into or positioned near each of the plurality of devices 21. The emission unit 26 emits an electromagnetic wave. The mobile terminal 40 includes the receiving unit 41, the display unit 42, and the input unit 43. The receiving unit 41 receives an electromagnetic wave emitted from the emission unit 26. The input unit 43 accepts an input of an operator.

The registration operation is performed as follows. First, the mobile terminal 40 receives an electromagnetic wave emitted from the emission unit 26 (S102). Then, the mobile terminal 40 displays, on the display unit 42, identification information of the device 21 corresponding to the emission unit (S103). The operator inputs position information of the device 21 in the building (S104). As a result, the registration of the device 21 is completed.

When the registration is completed, the display of the device for which the registration is completed is changed (S106).

The display of the device for which the registration is completed is changed after the registration operation is completed, thus ensuring that the operator can grasp which device has been registered.

In addition, the display of the registered device is changed in both the list of pieces of identification information and the map for the inside of the building, thus ensuring that the operator can grasp the association between the identification information and the position information of the device.

(4-2)

In the device-registration-operation assisting apparatus 2 according to this embodiment, the emission unit 26 may stop the transmission of an electromagnetic wave after the mobile terminal 40 receives an electromagnetic wave from the emission unit 26 (S102).

This can reduce the risk of duplicate registration of the same device.

Furthermore, if a registered device stops the emission of an electromagnetic wave, an electromagnetic wave emitted from the emission unit related to the registered device may not affect an electromagnetic wave emitted from another emission unit when another device is registered.

(4-3)

The display unit 42 according to this embodiment is capable of displaying a map for the inside of the building 20. As described in the lower portions of FIG. 3 to FIG. 6, the display of the display unit 42 describes the positions of devices in the building in an understandable manner using a GUI, which allows the operator to easily understand the progress of the registration operation.

(4-4)

The display unit 42 according to this embodiment is capable of displaying a list of a plurality of devices 21 including the device 21 into or near which the emission unit 26 is integrated or positioned. The operator can grasp an overall view of devices to be registered, which facilitates a smooth registration operation.

(5) Modifications (5-1) Modification 1A

The first embodiment describes an example in which the emission unit 26 stops the transmission of an electromagnetic wave after the mobile terminal 40 receives an electromagnetic wave from the emission unit 26 (S102). In Modification 1A, even after the registration operation of one device 21 is completed, the emitter continues to emit an electromagnetic wave. Even upon receipt of an electromagnetic wave emitted from the emission unit 26, the terminal 40 does not provide display to urge the operator to re-register the device if the device is determined to have been registered.

This can reduce the risk of duplicate registration of the same device.

(5-2) Modification 1B

The first embodiment describes a case where the registration assistance program, identification information of devices, and map information of a building are saved in the memory 44b of the mobile terminal 40. In Modification 1B, these are saved in the management device 10. The assistance program is executed by the management device 10, and the mobile terminal 40 is used as a browser. Through the registration operation, registration is directly registered in the management device 10.

Even in the case of Modification 1B, completely the same operations and effects as those of the first embodiment can be expected.

(5-3) Modification 1C

In Embodiment 1, the mobile terminal 40 includes the network communication unit 45. In Modification 1C, the mobile terminal 40 does not include the network communication unit 45. In this case, the mobile terminal stores the assistance program, and, additionally, necessary information, such as identification information of devices and map information of a building, is input to the mobile terminal in advance. After the registration operation is performed with the mobile terminal 40, data is collectively transmitted to the management device 10. For example, after finishing the operation inside the building, the operator may connect the mobile terminal 40 to a computer connected to another network and transmit the data in the mobile terminal 40 to the management device 10. In this case, registration in the management device is performed later. However, substantially the same registration operation as that in the first embodiment can be performed.

(5-4) Modification 1D

In the first embodiment, a registered device 21 is shown hatched or the like. In Modification 1D, a registered device 21 is erased from the display screen. This ensures that the operator can recognize completion of the registration.

(5-5) Modification 1E

The map information of the inside of the building is stored in the mobile terminal 40 in the first embodiment, and is stored in the management device 10 in Modification 1B. At the time of the registration operation, the map information is displayed on the mobile terminal 40 to assist the operator. In Modification 1E, the map information of the inside of the building is not stored in the system 1 or the assisting apparatus 2. In Modification 1E, the map information of the inside of the building is stored on paper.

The operator performs the registration operation while viewing the map information of the inside of the building on paper. The mobile terminal displays only the list of devices in the upper portions of FIG. 3 to FIG. 6. The operation performed by the operator is basically the same as that illustrated in the flowchart in FIG. 2. When the terminal receives an electromagnetic wave (S102), identification information of the device is displayed in a table on the display unit 42 of the terminal. In accordance with the identification information of the device 21, the operator inputs the address of the device on the map for the inside of the building, for example, device No. 3 in Room 501 at the fifth floor in the example in the first embodiment (S104). As a result, the registration operation is completed.

(5-6) Modification 1F

The identification information of devices is stored in advance in the mobile terminal 40 in the first embodiment and in the management device 10 in Modification 1B. At the time of the registration operation, a list of devices is displayed to the operator in advance. In Modification 1F, the list does not display identification information of an unregistered device other than devices that have been and are being registered.

Since the identification number of only one device for which the operation is to be performed is displayed to the operator, the operator can recognize the identification number of the device 21 under the operation without confusion.

In Modification 1F, the mobile terminal 40 or the management device 10 may not include the identification information of the devices 21. In this case, in response to the mobile terminal 40 receiving an electromagnetic wave from the emission unit 26, the identification information such as the MAC address of the device is accumulated in the mobile terminal 40 or the management device 10.

(5-7) Modification 1G

In the tables in FIG. 3 to FIG. 6, two identification numbers, namely, the device No. and the MAC address, are displayed. In Modification 1G, only the device No. is displayed. Only the MAC address may be displayed.

(5-8) Modification 1H

In the device management system 1 according to the first embodiment, the devices 21 are connected to the network 15 via the information transfer device 30. In Modification 1H, the devices 21 are directly connected to the network 15.

(5-9) Modification 1I

In the first embodiment, as illustrated in FIG. 3 to FIG. 6, the table of devices and a map for the inside of the building are simultaneously displayed on the mobile terminal 40. In Modification 1I, the table and the map are not simultaneously displayed, but one of them is displayed. When one of them is being displayed, an invocation button for invoking the other is provided on the screen. This provides advantages such as use of a wide space of the screen and presentation of the map on a large display.

While an embodiment of the present disclosure has been described, it will be understood that forms and details can be changed in various ways without departing from the spirit and scope of the present disclosure as recited in the claims.

What is claimed is:

1. A device-registration-operation assisting apparatus for a device management system that includes a plurality of devices installed in a building and a management device connected to the devices via a network, the device-registration-operation assisting apparatus being configured to assist in a registration operation for registering each of the plurality of devices to the device management system, the device-registration-operation assisting apparatus comprising:

an emitter configured to emit an electromagnetic wave, the emitter being integrated into or positioned near one device of the plurality of devices; and a mobile terminal, the mobile terminal including
a receiver configured to receive the electromagnetic wave,
a display configured to display device information of the one device,
an input unit configured to receive an input of registration information in order to perform the registration operation with respect to the one device, and
a controller that controls the display, the controller being configured to control the display to
display both a list of the plurality of devices including the one device and a map of an inside of the building simultaneously, the list including alphanumeric characters, and the list and the map being displayed separately on different portions of the display, and
either not display the device information of the one device or change the display of the device information of the one device after the registration operation of the one device has been completed.

2. The device-registration operation assisting apparatus according to claim 1, wherein
the emitter is configured to stop emission of the electromagnetic wave after the receiver receives the electromagnetic wave.

3. The device-registration operation assisting apparatus according to claim 1, wherein the input unit includes at least one of a keyboard, a touch panel, or an audio input device.

4. The device-registration operation assisting apparatus according to claim 1, wherein
the controller is configured to display the list above the map on the display.

5. The device-registration operation assisting apparatus according to claim 1, wherein
the controller is configured to change the display of the device information of the one device after the registration operation of the one device has been completed, the changing the display includes changing how the one device is displayed in the list and changing how the one device is displayed on the map.

6. The device-registration operation assisting apparatus according to claim 1, wherein
the controller is configured to display the device information adjacent the registration information in the list.

7. The device-registration operation assisting apparatus according to claim 6, wherein
the device information is unique identification information assigned to the one device, and the registration information is position information designating a location of the one device on the map.

8. The device-registration operation assisting apparatus according to claim 6, wherein
the device information and the registration information are expressed with the alphanumeric characters in the list.

9. The device-registration operation assisting apparatus according to claim 8, wherein
the device information in the list includes a MAC address.

10. The device-registration operation assisting apparatus according to claim 1, wherein
each device among the plurality of devices in the list is identified using the alphanumeric characters.

* * * * *